(No Model.)
D. C. VAN BRUNT.
CULTIVATOR.
No. 251,976. Patented Jan. 3, 1882.
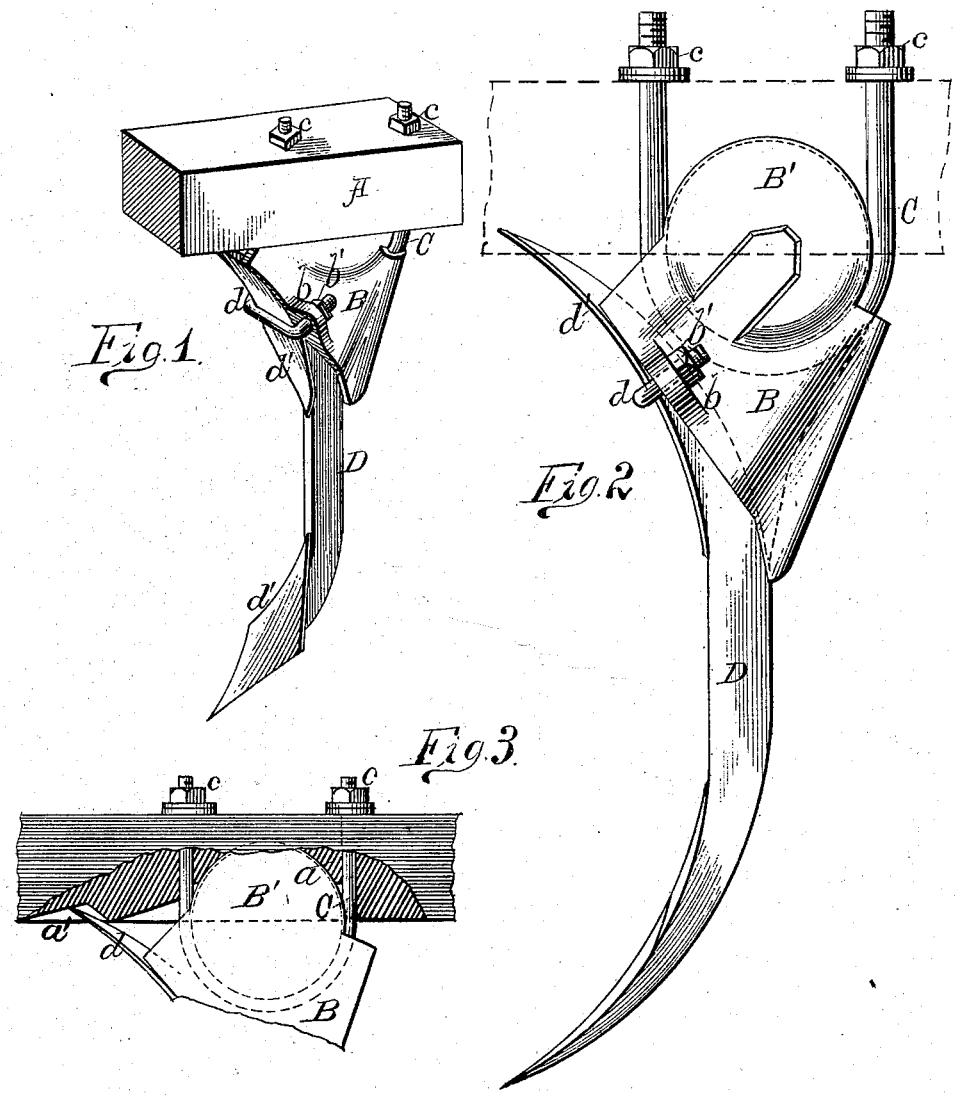

UNITED STATES PATENT OFFICE.

DANIEL C. VAN BRUNT, OF HORICON, WISCONSIN.

CULTIVATOR.

SPECIFICATION forming part of Letters Patent No. 251,976, dated January 3, 1882.

Application filed September 27, 1881. (No model.)

*To all whom it may concern:*

Be it known that I, DANIEL C. VAN BRUNT, of Horicon, in the county of Dodge, and in the State of Wisconsin, have invented certain new and useful Improvements in Cultivators; and I do hereby declare that the following is a full, clear, and exact description thereof.

My invention relates to that class of cultivator-teeth that are designed to slip and give when they meet an obstruction that would be likely to bend a tooth that was rigidly secured to its beam; and the nature of my invention will be fully set forth hereinafter.

In the drawings, Figure 1 is a perspective view of my device and a section of a cultivator-beam. Fig. 2 is a side view of my device, with a portion of the beam shown in dotted lines; and Fig. 3 is a side view of the upper portion of the tooth-clamp with part of the beam broken away.

A is a section of one of the beams of a cultivator. B is a clamp, having a hub, B', cast with it, and hollowed out to receive the staple C from below, which straddles the hub B'. The arms of staple C are then thrust into openings in the beam, and, passing out through the top, receive nuts $c$ upon their screw-threaded ends, by which the staple is tightened to draw the hub up into the concavity $a$ in the beam, so as to fit tightly therein.

I use the well-known reversible style of tooth D, and this I secure to the clamp by a strap, $d$, which, embracing one of the shovels $d'$ of the tooth, is bent so that its ends project into ears $b$ of the clamp B, to receive tightening-nuts $b'$, which draw the shank of the tooth into the hollow of the clamp until the back of the upper shovel rests upon the edges of the clamp. The beams are also concaved at $a'$, just in front of each of the concavities $a$, to admit the point of the upper shovel when the tooth is in position.

Operation: When the tooth is to be adjusted the nuts on the staple C are loosened. The clamp may then be turned in the direction of the length of the beam to secure the desired inclination of the tooth, and this having been done, the staple is drawn up by its nuts until the friction between the bottom of the concavity in the beam and the upper segment of the hub is sufficient to overcome the resistance of the earth in which the cultivator is to work, but not so great but that it would be overcome by meeting such an obstruction as a log or stone, in which case, instead of the tooth being broken or bent by resisting the obstruction, it will be merely thrown back from below, so as to point to the rear, and will slide over the obstruction, the hub B' turning in bearings formed by the beam above and the staple-hook below. After the obstruction has been passed the nuts may be turned so as to loosen staple C, and the tooth can then be readjusted, to be secured again by tightening the nuts on the staple.

What I claim as my invention, and desire to secure by Letters Patent, is—

1. A clamp for cultivator-teeth having hub B' and ears $b$, in combination with a tooth, D, staple $d$, and securing-nuts.

2. A cultivator-beam having concavity $a$, in combination with clamp having hub B', the staple C, and nuts, as set forth.

In testimony that I claim the foregoing I have hereunto set my hand this 20th day of September, 1881.

DANIEL C. VAN BRUNT.

Witnesses:
S. S. STOUT,
HAROLD G. UNDERWOOD.